United States Patent Office 3,644,622
Patented Feb. 22, 1972

3,644,622
NOVEL POLYMETHYLENE QUINOXALINE DIOXIDES FOR TREATING RESPIRATORY DISEASES AND AS GROWTH PROMOTANTS
James David Johnston, Old Saybrook, Conn., assignor to Pfizer Inc., New York, N.Y.
No Drawing. Application Oct. 18, 1966, Ser. No. 587,406, now Patent No. 3,485,836, which is a continuation-in-part of application Ser. No. 463,933, June 14, 1965. Divided and this application Apr. 9, 1969, Ser. No. 833,231
Int. Cl. A61k 27/00
U.S. Cl. 424—250
6 Claims

ABSTRACT OF THE DISCLOSURE

Series of 2,3-dihydro-1H-cyclopenta[b]quinoxaline-4,9-dioxides useful in the control of gram-negative infections in animals and for the promotion of weight gain and feed efficiency of animals and novel feed compositions containing said compounds.

---

This application is a division of application Ser. No. 587,406 as filed Oct. 18, 1966, now U.S. Pat. 3,485,836, which, in turn, is a continuation-in-part of application Ser. No. 463,933, filed June 14, 1965 and now abandoned.

This invention relates to novel polymethylene quinoxaline-1,4-dioxides useful as therapeutic agents and to processes for the treatment of antibacterial infections and for the promotion of growth in animals. More particularly, it relates to a series of 2,3-dihydro-1H-cyclopenta[b]quinoxaline-4,9-dioxides useful for the control of gram-negative infections in animals, and for promotion of weight gain and feed efficiency of animals, and to novel feed compositions containing said compounds.

The novel compounds of this invention have the general formulae:

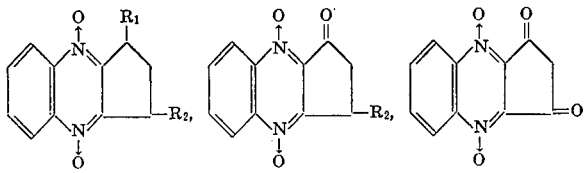

and

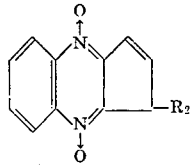

wherein $R_1$ is selected from the group consisting of hydroxy, lower alkoxy, mercapto, lower alkylmercapto, lower alkanoyloxy, cyano, carboxy, carbo(lower)alkoxy, chloro and bromo; $R_2$ is selected from the group consisting of hydrogen and $R_1$.

Of the lower alkoxy, carbo(lower)alkoxy, lower alkylmercapto and lower alkanoyloxy groups, those having from one to four carbon atoms in the alkoxy, alkylmercapto and alkanoyloxy moieties are preferred since they are more readily prepared.

Also included within this invention are the non-toxic mineral acid addition salts of the above mentioned bases and the non-toxic alkali metal and alkaline earth metal salts of those compounds wherein $R_1$ and/or $R_2$ is carboxy. By "non-toxic" salts is meant those salts which do not cause a toxic reaction to the animal in the dosages administered. The preferred acid addition salts of the above mentioned bases which may be employed are the hydrochloride, hydrobromide, phosphate, nitrate and sulfate. The non-toxic metal salts of particular interest are the sodium, potassium, calcium and magnesium salts.

The disubstituted 2,3-dihydro-1H-cyclopenta[b]quinoxaline-4,9-dioxides of Formula I and their free bases exist in two epimeric forms. Both epimers of a given compound are active antibacterial agents.

The antibacterial activity of several 2,3-polymethylene quinoxaline 1,4-dioxides has been disclosed in the literature. Ursprung, U.S. Patent 2,891,062, describes the activity of certain 1-hydroxy- and 1,4-dihydroxy-1,2,3,4-tetrahydrophenazine-5,10-dioxides as anti-infective agents, especially against *Proteus vulgaris*. The antifungal activity of the epimeric 1,4-dibromo-1,2,3,4-tetrahydrophenazine-5,10-dioxides is disclosed by Gordon et al. in U.S. Patent 2,921,937. Iland (Nature 161, 1010, 1948) and McIlwain (J. Chem. Soc. 323–325, 1943) describe the antibacterial properties of 1,2,3,4-tetrahydrophenazine-5,10-dioxide.

Hurst et al., Brit. J. Pharmacol 8, 297–305 (1953), report on the activity of several 1,2,3,4-tetrahydrophenazine-5,10-dioxides and of 2,3-pentamethylenequinoxaline-1,4-dioxide against the largest viruses of the psittacosis lymphogranuloma group and note that toxic side-reactions preclude their use in man. The latter compound was found to be, at most, only slightly active against the viruses studied. Landquist, J. Chem. Soc. 2551–2553 (1956), describes the preparation of a series of 2,3-polymethylene quinoxaline-1,4-dioxides wherein the polymethylene moiety is tri-, tetra- and pentamethylene as potential chemotherapeutic agents. The preparation and bacteriostatic study of several substituted 1,2,3,4-tetrahydrophenazine-5,10-dioxides are reported by King et al., J. Chem. Soc. 3012–3016 (1949).

The valuable compounds of this invention are readily prepared by methods well known in the art. The most convenient methods from the standpoint of availability of materials, ease and simplicity of reaction, yield and purity of product for preparing compounds of Formula I are the condensation of 1,2-cyclopentanedione with o-phenylenediamine, and of the reaction of cyclopentanone with o-aminoazobenzene. The parent 2,3-dihydro-1H-cyclopenta[b]quinoxaline thus obtained is then oxidized by means of peracids, e.g., hydrogen peroxide in glacial acetic acid, peracetic acid, m-chlorperbenzoic acid, performic acid or monoperphthalate acid, to the corresponding mono- or dioxide depending upon the molar proportion of oxidizing agent used.

The mono-, or dioxide, is then treated with a lower alkanoic acid anhydride to produce the corresponding 1-lower alkanoyloxy quinoxaline compound, or in the case of the dioxide the corresponding 1,3-di(lower) alkanoyloxy quinoxaline compound, in a Boekelheide rearrangement. Peracid oxidation of the lower alkanoyloxy compounds affords the desired lower alkanoyloxy substituted 2,3-dihydro-1H-cyclopenta[b]quinoxaline dioxides. Acid hydrolysis provides the corresponding mono- or dihydroxy derivatives.

The rearrangement is conveniently conducted by heating the 2,3-dihydro-1H-cyclopenta[b]quinoxaline-1-oxide or 1,4-dioxide at an elevated temperature, e.g., from about 50° C. to the boiling point of the solvent medium, with an excess of the desired lower alkanoyl anhydride. The excess anhydride generally serves as solvent medium. However, reaction-inert solvents, that is, solvents which do not react in an undesired manner with the reactants or products under the conditions of the reaction can be used. A minimum of laboratory experimentation will permit the selection of suitable solvents for this reaction. Exemplary of such solvents are dioxane, tetrahydrofuran, carbon tetrachloride, chloroform, methyl ether of diethylene glycol and the methyl ether of ethylene glycol. The reaction is run for a period of about 30 minutes, or longer if necessary, and the product recovered by removal of the excess lower alkanoyl anhydride and/or solvent medium.

Alternatively, the lower alkanoyloxy derivatives can be prepared as described by Gordon, U.S. Patent 2,921,937, which comprises reacting the halogenated derivatives with a tertiary amine salt of the appropriate lower alkanoic acid. The amine salt is conveniently, but not necessarily, formed in situ by simply mixing the amine and acid. Although any tertiary amine is suitable, pyridine, trimethylamine, triethylamine and dimethylaniline are favored because of their availability.

In general, an excess of the tertiary amine and lower alkanoic acid are used, about 2 to 3 moles of tertiary amine and about 4 to 5 moles of lower alkanoic acid per mole of dihalogenated compound. Larger or smaller ratios of amine and acid can be used but afford no advantages. Smaller ratios of amine and acid increase the length of time required for the reaction. The liquid alkanes and halogenated alkanes serve as solvents for this reaction. Temperatures of from about 15° to 120° C. and reaction periods of from about one to about 24 hours provide satisfactory yields.

The lower alkanoyloxy substituted 2,3-dihydro-1H-cyclopenta[b]quinoxaline dioxides thus obtained serve as intermediates for the remaining novel products of this invention. For example, by acid hydrolysis the alkanoyloxy groups are converted to hydroxy groups. Suitable acid hydrolyzing agents are the mineral acids, e.g. hydrochloric, hydrobromic, sulfuric, nitric, phosphoric. The reaction is generally conducted at a temperature of from about 10° C. to about 50° C., and preferably at room temperature for periods of from about 1 to about 24 hours. The concentrated form of the acid is favored since it accelerates the rate of reaction and affords better yields than do lower concentrations.

The formyloxy derivatives are prepared by the acylation of the corresponding mono- or dihydroxy compound, e.g., by means of acetoformic acid, at a temperature of from about −30° C. to about 50° C., or of formyl fluoride.

Acetoformic acid reagent suitable for the present process is prepared by mixing one volume of 100% formic acid with two volumes of acetic anhydride. Approximately 72 ml. of this reagent is equivalent to one mole of acetoformic acid anhydride. Excess of acetoformic acid reagent is employed when higher reaction temperatures are employed since the reagent is decomposed in the presence of basic substances to provide acetic acid and carbon monoxide. This side reaction becomes increasingly rapid above 10° C. Therefore, it is preferred to operate below this temperature. As a practical matter, the range from 0 to 10° C. is preferred for best results and economy. When operating in this temperature range, from 1.5 to 2 milliliters of acetoformic acid reagent per gram of antibiotic reactant is satisfactory. An equimolecular proportion of the reagent is adequate at the lower level of the temperature range.

Diluents which are non-reactive and do not catalyze decomposition of the reagent at the reaction temperature can sometimes be advantageously employed in the present process. Illustrative of operable diluents are non-hydroxyl containing solvents such as dioxane, toluene, benzene, dimethylformamide, ethyl acetate, methyl isobutyl ketone, acetone, pyridine, quinoline, etc. Hydroxylated solvents such as the lower alkanols and glycols are not satisfactory due to the tendency of acetoformic acid reagent to react with these materials. It has been found that the present process is particularly adapted to the use of pyridine as a solvent medium.

The hydroxy group (or groups) can be replaced by chloro and bromo by reaction with thionyl chloride, thionyl bromide, phosphorous tribromide or phosphorous trichloride in the presence of a tertiary organic base such as pyridine, dimethyl- and diethylaniline.

The monohalo (chloro and bromo) derivatives of Formula I are preferably prepared by halogenation of 2,3-dihydro-1H-cyclopenta[b]quinoxaline dioxide in a reaction-inert solvent medium such as a liquid alkane, a liquid halogenated alkane and N-alkylated lower amide; e.g. n-hexane, chloroform, carbon tetrachloride, N-methyl formamide, N,N-dimethylformamide. Molar ratios of halogenating agent to 2,3-dihydro-1H-cyclopenta[b]quinoxaline-1,4-dioxide of 1:1 favor production of monohalogenated derivatives. For the production of dihalogenated products molar ratios of about 2 to 8 moles of halogenating agent to starting compound are used. Larger amounts of halogenating agent can be used but afford no apparent advantages. The reaction is conducted at a temperature of from about 15° to about 180° C. for a period of from about 1 to about 3 hours and most conveniently at the reflux temperature of the solvent medium for periods of from about 1 to about 5 hours.

Suitable halogenating agents for the present process include bromine; chlorine; iodochloride; iodobromide; N-chloro, and N-bromo lower alkanoic acid amide, e.g. N-chlor, and N-bromacetamide; hydrocarbon dicarboxylic acid imides, e.g. N-chloro-, N-bromosuccinimide, phthalimide, and the like and N-lower-alkanoyl anilines, e.g. N-bromoacetanilide, propionanilide and the like; 3-chloro-, 3-bromo-, 3,5-dichloro and 3,5-dibromo-5,5-dimethylhydantoin; pyridinium perbromide and perchloride hydrohalides, e.g. pyridinium perbromide hydrobromide; pyridinium perchloride hydrochloride; and lower alkyl hypochlorites, e.g. tertiary butylhypochlorite. It is obvious that, in general, any halogenating agent employed in the art is operable, but the above are preferred.

The products are thus obtained as their hydrohalide salts. The salts are converted to the free bases by treatment with an alkaline reagent such as an alkali metal or alkaline earth metal hydroxide, carbonate or bicarbonate.

The chloro and bromo groups are then converted by metathesis to cyano, mercapto, lower alkyl mercapto or lower alkoxy groups by a Williamson type reaction using metallic salts of hydrogen cyanide, hydrogen sulfide, lower alkyl mercaptans or lower alcohols as reactants. The preferred metal salts are those of the alkali metals, especially sodium and potassium. Other metal salts such as the lead, zinc, magnesium salts can also be used.

Alternatively, the methoxy and methyl-mercapto ethers are prepared by methylation of the oxy- or mercapto groups with dimethyl sulfate or diazo methane according to known methods.

Oxidation of the hydroxy group or groups as the case may be produces the corresponding mono- or di-keto compounds (Formulae II and III). Suitable oxidizing agents are chromium trioxide, potassium dichromate and potassium permanganate. The oxidation of the hydroxy group or groups can be accomplished before, after or simultaneously with introduction of the N-oxide groups.

Dehydration of the monohydroxy compounds by suitable agents, e.g. sulfuric acid, produces the corresponding monounsaturated compounds (Formula IV).

The novel carboxy and carbo(lower)alkoxy derivatives are prepared by condensation of the appropriate 1,2-cyclopentanedione mono- or dicarbo(lower)alkoxy compound, e.g. 1,2-cyclopentanedione-3-ethylcarboxylate, 1,2-cyclopentanedione-3,5-diethylcarboxylate, with o-phenylenediamine, generally in the presence of a small amount of acid such as concentrated hydrochloric acid, in a reaction-inert solvent followed by peracid oxidation to give the dioxide. Suitable solvents are benzene, xylene, toluene and other aromatic hydrocarbons. The reaction is conducted at an elevated temperature, preferably at the reflux temperature of the solvent system, with removal of water as by azeotropic distillation.

Acid hydrolysis of the carbo(lower)alkoxy derivatives with a mineral acid (hydrochloric, hydrobromic, sulfuric, nitric, phosphoric) or with an alkali or alkaline earth hydroxide, bicarbonate or carbonate produces the carboxy derivative. Alternatively, the carboxy derivatives are produced by hydrolysis, preferably acid hydrolysis, of the corresponding cyano derivatives. Subsequent esterification of the acid derivatives provides the esters according to known procedures.

The unsaturated compounds of Formula IV participate in electrophilic addition reactions with a variety of nucleophilic reagents such as the hydrogen halides, primary and secondary amines, hydrogen cyanide, hypohalous acids, halogens and epoxide formation to produce novel compounds useful as antibacterial agents and as intermediates for the production of a variety of products, many of which are antibacterial agents.

The reaction sequence described above is illustrated in part below using 2,3-dihydro-1H-cyclopental[b]quinoxaline as starting material to produce mono- and disubstituted products (Ac represents lower alkanoyl).

ciency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, hyaluronidase, local anesthetics and inorganic salts to afford desirable pharmacological properties. For oral administration dosages of from about 1 mg./kg. to about 60 mg./kg. of body weight are favored. This can be achieved by a number of methods including dosage unit formulations such as capsules, tablets, lozenges, troches, liquid mixtures and solutions. In the case of poultry and domestic ani-

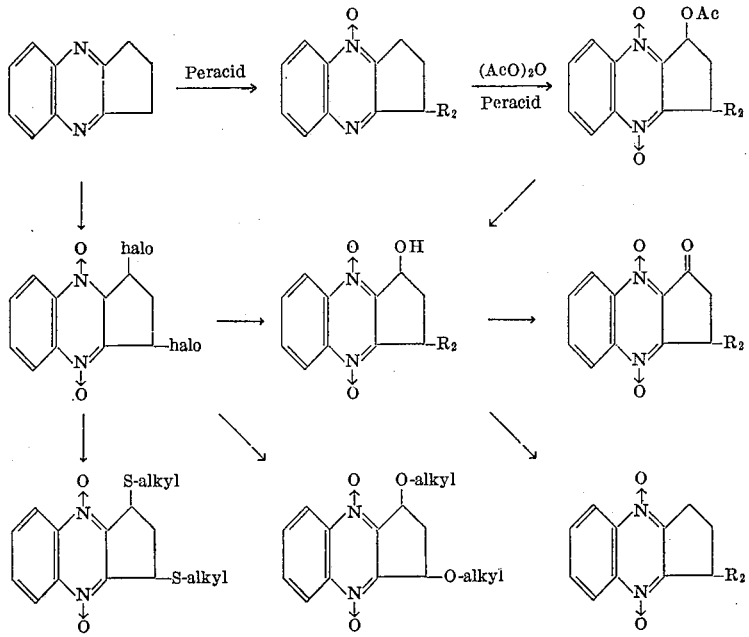

The mineral acid addition salts are prepared by dissolving the free base in a suitable non-aqueous solvent, e.g. acetone, ether, lower aliphatic alcohols (ethanol, isopropanol) containing the desired acid, or to which the stoichiometric amount of the desired acid is added. The alkali metal and alkaline earth metal salts of the mono- and dicarboxy substituted compounds of this invention are prepared by simple neutralization of the acid derivative in aqueous solution with the appropriate metal hydroxide, carbonate or bicarbonate and recovered by precipitation with a non-solvent, evaporation of the solvent or by lyophilization.

The herein described products of this invention are valuable agents for the control (treatment and prophylaxis) of urinary tract and systemic infections in animals including man and are of particular value against gram-negative infections both in vitro and in vivo. Further, these products and the parent 2,3-dihydro-1H-cyclopenta-[b]-quinoxaline-4,9-dioxide are effective in controlling air sacculitis ("air sac" disease) of poultry, and significantly promote growth and improve feed efficiency of domestic animals, especially of poultry in the presence, and in the absence, of such infections.

When used for such purposes the compounds described herein can be administered orally or parenterally, e.g. by subcutaneous or intramuscular injection, at a dosage of from about 1 mg./kg. to about 100 mg./kg. of body weight. For parenteral administration dosages of from about 10 mg./kg. to about 100 mg./kg. of body weight are preferred. Vehicles suitable for parenteral injection may be either aqueous such as water, isotonic saline, isotonic dextrose, Ringer's solution, or non-aqueous such as fatty oils of vegetable origin (cotton seed, peanut oil, corn, sesame), dimethylsulfoxide and other non-aqueous vehicles which will not interfere with the therapeutic efficiency mals other method include mixing with the feed, the preparation of feed concentrates and supplements. Additionally, dilute solutions or suspensions, e.g. a 0.1% solution, can be supplied for drinking purposes.

For prophylatic use, about 10 to about 100 mg./kg. of body weight daily is administered. The above methods of administration are suitable although administration in he animal's food, water or mineral mixture is more convenient.

In still another modification of this invention the poultry are isolated and subjected, in a confined space, to a fine dust of silica on which is dispersed or adsorbed one or more of the herein described compounds. The silica, comprising particles of up to 20 mμ or less size, is suspended in the air breathed by the poultry.

The unique feed compositions of this invention are found to be particularly valuable for use with poultry and especially for poultry infected with chronic respiratory disease. A type of conventional feed material which may be employed is recommended to contain roughly between 50% and 80% of grains, between 0% and 10% animal protein, between 5% and 30% vegetable protein, between 2% and 4% minerals together with supplemental vitaminaceous sources. When a feed containing a major proportion of these substances and a minor proportion of one of the herein mentioned drugs is employed, the poultry shows a marked improvement, if not complete recovery, over the infection and reach the desirable weight in a shorter period of time than usual with a markedly greater feed efficiency. It should be noted that these valuable products eliminate, or at least minimize, the economic losses normally associated with chronic respiratory disease.

Further, the addition of a low level of one or more of the herein described 2,3-dihydro-1H-cyclopenta[b] quinoxaline-4,9-dioxides and derivatives thereof to the diet of healthy animals, both ruminant and non-ruminant, such that these animals receive the product over an extended period of time, at a level of from about 1 mg./kg. to about 100 mg./kg. of body weight per day, especially over a major portion of their active growth period, results in an acceleration of the rate of growth and improved feed efficiency. Included in these two classes of animals are poultry (chickens, ducks, turkeys), cattle, sheep, dogs, cats, swine, rats, mice, horses, goats, mules, rabbits, mink, etc. The beneficial effects in growth rate and feed efficiency are over and above what is normally obtained with complete nutritious diets containing all the nutrients, vitamins, minerals and other factors known to be required for the maximum healthy growth of such animals. The animals thus attain market size sooner and on less feed.

The herein described feed compositions have been found to be particularly valuable and outstanding in the case of such animals as poultry, rats, hogs, swine, lambs, cattle, and the like. In some instances the degree of response may vary with respect to the sex of the animals. The products may, of course, be administered in one component of the feed or they may be blended uniformly throughout a mixed feed; alternatively as noted above, they may be administered in an equivalent amount via the animal's water ration. It should be noted that a variety of feed components may be of use in the nutritionally balanced feeds.

The resulting new feed compositions have marked effects on the rate of growth and feed efficiency. Feed efficiency, an extremely important economic factor in raising animals, may be defined as the number of pounds of feed required to produce a pound gain in weight. The novel feed supplements of this invention permit the use of higher energy, higher protein diets to obtain improved feed/gain ratios and the use of feedstuffs that at present are not utilized efficiently. Simply stated, the compositions of this invention when fed to animals are more efficiently converted to animal body weight than prior art compositions. Any animal feed composition may be prepared to comprise the usual nutritional balance of energy, proteins, minerals, and vitamins together with one or more of the quinoxaline-di-N-oxides described above. Some of the various components are commonly grains such as ground grain, and grain by-products; animal protein substances, such as meat, and fish by-products; vitaminaceous mixtures, e.g. vitamin A and D mixtures, riboflavin supplements and other vitamin B complexes; and bone meal, limestone, and other inorganic compounds to provide minerals.

The relative proportions of the present compounds in feeds and feed concentrates may vary somewhat, depending upon the compound, the feed with which they are employed and the animal consuming the same. These substances are advantageously combined in such relative proportions with edible carriers to provide concentrates which may readily be blended with standard nutritionally balanced feeds or which may be used themselves as an adjunct to the normal feedings.

Dry pre-mixes containing these compounds are prepared containing from 0.10 to about 10% of the active ingredient mixed with salt (sodium chloride) and other minerals which it is desired to incorporate into the poultry ration. This can then be fed on an ad libitum basis by adjusting the proportion of active ingredient in the mixture to the average daily consumption per bird so as to provide the proper daily dose as specified above. If prepared feed suplements are employed, the material can be administered in admixture with the feed. Again a concentration range of about 0.10 to 10% of the drug in the feed is employed. However, higher proportions can be satisfactorily employed depending upon the palatability of the product to the poultry. This can be readily determined by simple experimentation. It is sometimes convenient to mix the daily dose with only a portion of the average daily allotment to insure complete consumption of the dose. The balance of the daily feed supplement can then be fed after consumption of the medicated portion in the usual fashion. These methods are particularly useful for prophylactic treatment, but similar compositions can be employed for therapeutic use.

In the preparation of concentrates a wide variety of carriers may be employed containing the aforesaid drugs. Suitable carriers include the following; soybean oil meal, corn gluten meal, cotton seed oil meal, sunflower seed meal, linseed oil meal, cornmeal, limestone and corncob meal. The carrier facilitates uniform distribution of the active materials in the finished feed with which the concentrate is blended. This is especially important because only a small proportion of these potent materials are required. The concentrate may be surface coated, if desired, with various proteinaceous materials or edible waxes, such as zein, gelatin, microcrystalline wax and the like to provide a protective film which seals in the active ingredients. It will be appreciated that the proportions of the drug preparation in such concentrates are capable of wide variation since the amount of active materials in the finished feed may be adjusted by blending the appropriate proportion of concentrate with the feed to obtain the desired degree of supplementation. In the preparation of high potency concentrates, i.e. premixes, suitable for blending by feed manufacturers to produce finished feeds or concentrates of lower potency, the drug content may range from about 0.1 g. to 50 g. per pound of concentrate. A particularly useful concentrate is provided by blending 2 g. of drug with 1 pound of limestone or 1 pound of limestone-soybean oil meal (1:1). Other dietary supplements, such as vitamins, minerals, etc. may be added to the concentrates in the appropriate circumstances.

The high potency concentrates may be blended by the fed manufacturer with proteinaceous carriers, such as soybean oil meal, to produce concentrated supplements which are suitable for direct feeding to animals. In such instances the animals are permitted to consume the usual diet of corn, barley and other fibrous grains and the like. The proportion of the drug in these supplements may vary from about 0.1 to 10 g. per pound of supplement.

The concentrates described may also be added to animal feeds to produce a nutritionally balanced, finished feed containing from about 10 to about 125 g. of the herein described compounds per ton of finished feed. In the case of ruminants, the finished feed should contain protein, fat, fiber, carbohydrate, vitamins and minerals, each in amount sufficient to meet the nutritional requirements of the animal for which the feed is intended. Most of these substances are present in naturally occurring feed materials, such as alfalfa hay or meal, cracked corn, whole oats, soybean oil meal, corn silage, ground corn cobs, wheat bran, and dried molasses. Bone meal, limestone, iodized salt and trace minerals are frequently added to supply the necessary minerals, and urea to provide additional nitrogen.

As is well known to those skilled in the art, the types of diets are extremely variable depending upon the purpose, type of feeding operation, species, etc. Specific diets for various purposes are listed by Morrison in the Appendix of "Feeds and Feeding," The Morrison Publishing Company, Clinton, Iowa, 1959.

In the case of non-ruminant animals, such as hogs, a suitable feed may contain from about 50 to 80% of grains,, 3 to 10% animal protein, 5 to 30% vegetable protein, 2 to 4% of minerals, together with supplementary vitaminaceous sources.

Many of the compounds described herein have, in addition to the above mentioned utilities, unexpectedly significant activity in vivo against a variety of small and medium viruses such as the myxoviruses and especially against influenza PR8 and BGL. Care should, of course, be exercised when using these compounds for this purpose. Therapeutic dosages and regimens commensurate with the therapeutic index of these compounds can be administered without substantial adverse effect.

When used for the purposes described herein the quinoxaline-di-N-oxides can, of course, be used in combination with other known drugs such as the tetracycline-type antibiotics, carbomycin, neomycin, bacitracin and tylosin.

In addition to the above mentioned utilities, the quinoxaline-di-N-oxides described herein have unexpectedly been found to exhibit activity against antibiotic-resistant strains of microorganisms, such as antibiotic-resistant strains of *Escherichia coli* orginally isolated from poultry and from man. Further, this unexpected activity is surprisingly applicable to microorganisms in which resistance to antibiotics has been induced, as by exposure to other microorganisms already resistant to antibiotics.

The following examples are provided to illustrate in greater detail the manner of practicing the present invention. They are, however, not to be considered as limiting the scope thereof in any way.

EXAMPLE I 2,3-dihydro-1H-cyclopenta[b]quinoxaline

Cyclopentanedione (230 g.), o-phenylenediamine (250 g.) and 1 ml. concentrated hydrochloric acid are refluxed in 3 liters benzene for 6 hours and the by-product water (45 ml.) collected in a Dean-Stark trap. The reaction mixture is filtered and then reduced to half-volume in vacuo. The concentrate, chromatographed on a column of activated alumina, affords 391.6 g. of crude product. Purification is accomplished by adding hexane to a hot, concentrated acetone solution of the crude to the point of incipient crystallization. The pure product melts at 98°–100° C.

*Analysis.*—Calc. for $C_{11}H_{10}N_2$: C, 77.62; H, 5.92; N, 16.46%. Found: C, 77.69; H, 5.72; N, 16.45%.

U.V. ($CH_3OH$) shoulder: λ237($\epsilon$=19,500); λ241($\epsilon$=24,100); λ240($\epsilon$=21,900); shoulder λ308($\epsilon$=7,450); λ319($\epsilon$=9,650); shoulder λ331($\epsilon$=6,350).

EXAMPLE II 2,3-dihydro-1H-cyclopenta[b]quinoxaline-4-oxide

A solution of 2,3-dihydro-1H-cyclopenta[b]quinoxaline (170 g.) and m-chloroperbenzoic acid (200 g., 85%) dissolved in 2 liters of chloroform is allowed to stand at room temperature for 24 hours and is then refluxed for 15 minutes. The mixture is extracted with excess aqueous sodium bicarbonate solution, the chloroform solution dried with anhydrous sodium sulfate and the solvent removed in vacuo. Crystallization from acetone/hexane yields the crude product (32.1 g.); M.P. 144°–149° C. (dec.). The mother liquors are reduced to dryness and the residue chromatographed on a column of acid-washed Florsil using chloroform as eluant. Crystallization of the material obtained by evaporation of the chloroform eluate by precipitation from a hot, concentrated acetone solution with hexane yields the product; M.P. 100.5°–103° C. (154.0 g.). Repeated recrystallizations as above provide the pure product; M. P. 103°–104.5° C.

*Analysis.*—Calc. for $C_{11}H_{10}ON_2$: C, 70.95; H, 5.41; N, 15.05. Found: C, 71.14; H, 5.25; N, 15.12.

U.V. ($CH_3OH$): λ244($\epsilon$=52,400); λ317($\epsilon$=10,900); λ323($\epsilon$=11,000); λ339($\epsilon$=8,560).

EXAMPLE III 2,3-dihydro-1H-cyclopenta[b]quinoxaline-4,9-dioxide m-Chloroperbenzoic acid (70 g., 85%) is added to a solution of 2,3-dihydro-1H-cyclopenta[b]quinoxaline (37.0 g.) in 750 ml. chloroform with stirring. The reaction becomes exothermic after 10–15 minutes and is held at room temperature for 24 hours. The precipitated m-chlorobenzoic acid is filtered off and the mother liquid refluxed for 30 minutes. The mixture is cooled, washed twice with excess aqueous sodim bicarbonate solution, treated with activated charcoal and dried over anhydrous sodium sulfate. The residue obtained after removal of the solvent is crystallized from acetone/hexane to give yellow crystals; M.P. 160°–163° C. (13.1 g.). The mother liquors yield a second crop; M.P. 160°–166° C. (5.4 g.).

An analytical sample, obtained by recrystallization of the crude according to the procedure of Example I, melts at 172°–175° C.

*Analysis.*—Calc. for $C_{11}H_{10}O_2N_2$: C, 65.33; H, 4.98; N, 13.86%. Found: C, 65.18; H, 4.85; N, 13.51%.

U.V. ($CH_3OH$): λ235($\epsilon$=19,450); λ262$\epsilon$=36,800); shoulder λ355($\epsilon$=12,500); λ368($\epsilon$=15.050).

EXAMPLE IV 1-acetoxy-2,3-dihydro-1H-cyclopenta[b]quinoxaline

A solution of 2,3-dihydro-1H-cyclopenta[b]quinoxaline-4-oxide (5.0 g.) in acetic anhydride (25 ml.) is refluxed for 1 hour using a Sunbeam heat lamp as heat source. The acetic anhydride is then removed in vacuo and the resulting gum chromatographed on acid-washed Florisil using a 1:1 mixture of benzene-chloroform as eluant. Evaporation of the eluate gives 4.3 g. product which when twice recrystallized from ether/hexane as described in Example I yields crystals; M.P. 102°–103.5° C.

*Analysis.*—Calc. for $C_{13}H_{12}O_2N_2$: C, 68.41; H, 5.30; N, 12.27%. Found: C, 68.32; H, 5.42; N, 12.39%.

I.R. Principal absorption maxima 5.74 and 8.1–8.3 (u).
U.V. ($CH_3OH$): λ240($\epsilon$=24,000); λ232($\epsilon$=8,450).

The following lower alkanoyloxy derivatives are prepared as described above using the appropriate acid anhydride in place of acetic anhydride:

1-propionyloxy-2,3-dihydro-1H-cyclopenta[b]quinoxaline
1-butyryloxy-2,3-dihydro-1H-cyclopenta[b]quinoxaline
1-valeryloxy-2,3-dihydro-1H-cyclopenta[b]quinoxaline
1-caproyloxy-2,3-dihydro-1H-cyclopenta[b]quinoxaline
1-isobutyryloxy-2,3-dihydro-1H-cyclopenta[b]quinoxaline
1-isovaleryloxy-2,3-dihydro-1H-cyclopenta[b]quinoxaline

EXAMPLE V 1-acetoxy-2,3-dihydro-1H-cyclopenta[b]quinoxaline-4,9-dioxide 100 g. of m-chloroperbenzoic acid is added to a solution of 1-acetoxy-2,3-dihydro-1H-cyclopenta[b]quinoxaline (44 g.) in chloroform (500 ml.) with stirring at room temperature. The reaction mixture is allowed to stand for seven days at room temperature after which the precipitated n-chlorobenzoic acid is filtered off. The mother liquid is washed several times with saturated sodium bicarbonate solution, dried with anhydrous sodium sulfate, treated with activated charcoal, then taken to dryness in vacuo. Chromatography of the residue on an acid-washed Florisil column using benzene/chloroform mixtures for elution yields, after evaporation of the eluate and crystallization of the residue from acetone/hexane, 32.8 g. product; M.P. 145°–152° C. Recrystallization from acetone/hexane yields pure 1-acetoxy-2,3-dihydro-1H-cyclopenta[b]quinoxaline-4,9-dioxides; M.P. 155°–155.5° C. (dec.).

*Analysis.*—Calcd. for $C_{13}H_{12}O_4N_2$: C, 59.99; H, 4.65; N, 10.77%. Found: C, 60.07; H, 4.35; N, 10.31%.

I.R. ($CHCL_3$) Principal absorption maxima 5.70, 7.34 (u.). U.V. ($CH_3OH$): λ239($\epsilon$=18,400);

$$\lambda267(\epsilon=37,700)$$

shoulder λ363($\epsilon$=11,100); λ378($\epsilon$=13,700).

In like manner the remaining lower alkanoyloxy derivatives of Example IV are converted to the corresponding dioxides.

EXAMPLE VI 1-hydroxy-2,3-dihydro-1H-cyclopenta[b]quinoxaline-4,9-dioxide 1-acetoxy-2,3-dihydro-1H-cyclopenta[b]quinoxaline-4,9-dioxide (16.0 g.) is dissolved in concentrated hydrochloric acid (50 ml.) at room temperature. After 3 hours at room temperature the solution is evaporated to dryness on a rotary evaporator at a bath temperature below 40° C. The product, 8.2 g., M.P. 156°–158° C. (dec.) is obtained by crystallization of the residue from acetone/hexane. Recrystallization from chloroform/hexane yields pure product; M.P. 158°–160° C. (dec.).

Analysis.—Calc. for $C_{11}H_{10}O_3N_2$: C, 60.54; H, 4.62; N, 12.84%. Found: C, 60.40; H, 4.50; N, 12.82%.

U.V. ($CH_3OH$): $\lambda 234 (\epsilon=18,600)$; $\lambda 263 (\epsilon=33,000)$; shoulder $\lambda 361 (\epsilon=12,000)$; $\lambda 376 (\epsilon=14,200)$.

Hydrolysis of the remaining lower alkanoyloxy derivatives of Example V produces the same compound.

EXAMPLE VII 1-bromo-2,3-dihydro-1H-cyclopenta[b]quinoxaline-4,9-dioxide

To a solution of 2,3-dihydro-1H-cyclopenta[b]quinoxaline-4,9-dioxide (20.2 g., 0.1 mole) in chloroform (250 ml.) there is added, with stirring at room temperature, a solution of bromine (16 g.) in chloroform (250 ml.) dropwise during 3 hours. The bromine is added at such a rate that the bromine color disappears after each addition. Stirring is continued for 1 additional hour following completion of addition. The chloroform solution is washed with saturated sodium bicarbone solution and the product is isolated by concentration of the chloroform solution and crystallization from chloroform/hexane.

Repetition of this procedure but substituting the proper halogen and the appropriate polymethylene quinoxaline dioxide for the above above reactants yields the following compounds.

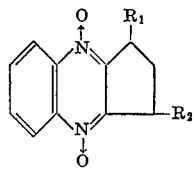

| $R_1$ | $R_2$ | $R_1$ | $R_2$ |
|---|---|---|---|
| Cl | H | Br | —$OC_2H_5$ |
| Cl | =COOCH$_3$ | Br | —SH |
| Br | —COOC$_2$H$_7$ | Cl | —SCH$_3$ |
| Br | —OCOCH$_3$ | Br | —SC$_5$H$_{13}$ |
| Br | —OCOC$_5$H$_{11}$ | Cl | —CN |
| Cl | —OCOC$_4$H$_9$ | Br | —COOH |
| Cl | —OH | Br | —COOCH$_3$ |
| Br | —OH | Br | —COOC$_5$H$_{11}$ |
| Cl | —OCH$_3$ | Br | COOC$_4$H$_9$ |
| Cl | —OC$_2$H$_5$ | Br | COO-i-C$_3$H$_7$ |
| Cl | —OC$_5$H$_{11}$ | | |

EXAMPLE VIII 1,3-dibromo-2,3-dihydro-1H-cyclopenta[b]quinoxaline-4,9-dioxide

To a solution of 2,3-dihydro-1H-cyclopenta[b]quinoxaline-4,9-dioxide (202.2 g., 1 mole) in 1500 ml. of chloroform there is added 2.5 moles of bromine in 800 ml. of chloroform. The solution is refluxed for 2 hours during which time hydrogen bromide is evolved. The mixture is concentrated to half volume in vacuo then cooled to 10–15° C. and filtered to remove the precipitated hydrogen bromide salt. The free base is obtained by slurrying the salt in an excess of 5% aqueous sodium bicarbonate solution. The base is then filtered off, washed free of inorganic salts and dried.

By means of this procedure 1,3-dichloro-2,3-dihydro-1H-cyclopenta[b]quinoxaline-4,9-dioxide is prepared using chlorine in place of bromine.

EXAMPLE IX 1,3-diacetoxy-2,3-dihydro-1H-cyclopenta[b]quinoxaline-4,9-dioxide

Method A.—To a solution of 1,3-dibromo-2,3-dihydro-1H-cyclopenta[b]quinoxaline-4,9-dioxide (180 g., 0.5 mole) in 1500 ml. of chloroform there is added acetic acid (2.75 moles) together with triethylamine (1.25 mole). The reaction mixture is refluxed in the dark for 4 hours then concentrated to about 150 ml. to obtain a mixture of the epimeric 1,3-diacetoxy-2,3-dihydro-1H-cyclopenta[b]quinoxaline-4,9-dioxides. The product is identical to that of Method B.

Repetition of this procedure but substituting acetic acid by propionic acid, butyric and valeric acid produces the corresponding lower alkanoyloxy compounds.

Method B.—A solution of 2,3-dihydro-1H-cyclopenta[b]quinoxaline-4,9-dioxide (20.0 g.) in acetic anhydride (100 ml.) is refluxed for 45 minutes and then the excess acetic anhydride removed in vacuo to yield a dark residue (33 g.). The dark color is removed by passing a solution of the residue in benzene:chloroform (1:1) through a column of acid-washed Florisil. Evaporation of the effluent gives a mixture of the stereoisomeric diacetates as a clear gum.

Principal absorption maxima: I.R. (CHCl$_3$) 5.71 and 8.0–8.2 (u.).

1,3 - diacetoxy-2,3-dihydro-1H-cyclopenta[b]quinoxaline stereoisomeric mixture (11.5 g.) is dissolved in acetic acid (50 ml.) and peracetic acid (40%, 25 ml.) added dropwise with stirring during 20 minutes. After standing 7 days at room temperature the reaction mixture is poured into one liter of water and the mixture then extracted with chloroform (4×250 ml.). The combined chloroform extract is washed repeatedly with saturated sodium bicarbonate, dried with anhydrous sodium sulfate and the chloroform removed in vacuo to yield a residual gum (6.6 g.). Chromatography on an acid-washed Florisil (an activated magnesium silicate) column using benzene/chloroform mixtures yields approximately 2.0 g. of the product which crystallizes from acetone/hexane to give yellow crystals; M.P. 189°–191° C.

Analysis.—Calc. for $C_{15}H_{14}O_6N_2$: C, 56.60; H, 4.43; N, 8.80%. Found: C, 56.77; H, 4.42; N, 8.88%.

I.R. (CHCl$_3$) Principal absorption maxima 5.75, 7.44 (u.). U.V. (CH$_3$OH): $\lambda 235(\epsilon=21,800)$; $\lambda 266 (\epsilon=38,000)$; shoulder $\lambda 370(\epsilon=11,500)$, $\lambda 383(\epsilon=13,000)$.

Repetition of this method but using the appropriate acid anhydride in place of acetic anhydride produces the following 1,3 - di(lower)alkanoyloxy derivatives: dipropionyloxy-, dibutyryloxy-, divaleryloxy-, diisovaleryl-, oxy- and dicaproyloxy.

EXAMPLE X 1,3-dihydroxy-2,3-dihydro-1H-cyclopenta[b]quinoxaline-4,9-dioxide

The title product of Example IX (10 g.) is dissolved in methanol (300 ml.) and 20% sulfuric acid (100 ml.) added. The mixture is held at room temperature for 120 days, during which time the product separates as crystals. The product is separated by filtration, washed with water and recrystallized from acetone to give the pure product. The remaining products of Example IX are similarly hydrolyzed to the same 1,3-dihydroxy compound.

Formylation of the dihydroxy compound following the procedure of Nesmeyanov, et al., Ber. 67, 370 (1934) produces the diformyloxy compound. The same compound is obtained by adding 50 ml. of acetoformic acid reagent to 10 g. of the dihydroxy compound in 40 ml. of pyridine at 0° C. After ½ hour in an ice bath the reaction mixture is poured into ice water and the product extracted with chloroform and recovered therefrom, after drying, by concentration to small volume.

EXAMPLE XI 1-cyano-2,3-dihydro-1H-cyclopenta[b]quinoxaline-4,9-dioxide 1-bromo - 2,3 - dihydro-1H-cyclopenta[b]quinoxaline-4,9-dioxide (11.2 g.) is dissolved in a solution of potassium cyanide (5 g.) and KI (0.5 g.) in methanol (one l.) by stirring at room temperature. After standing 2 days at room temperature the solution is diluted with 2 liters of water, and extracted with chloroform. Removal of the chloroform yields the product as a solid.

The following cyano derivatives of Formula I wherein $R_1$ is CN are similarly prepared from the appropriate bromo or chloro derivatives of Examples VII and VIII. In the case of the dicyano derivatives the proportion of potassium cyanide used is doubled.

| $R_2$ | |
|---|---|
| —CN | —OC$_5$H$_{11}$ |
| —OCOCH$_3$ | —SH |
| —OCOC$_3$H$_7$ | —SCH$_3$ |
| —OCOC$_5$H$_{11}$ | —SC$_6$H$_{13}$ |
| —OCOC$_4$H$_9$ | —COOH |
| —OH | —COOCH$_3$ |
| —OCH$_3$ | —COOC$_5$H$_{11}$ |
| —OC$_2$H$_5$ | |

EXAMPLE XII 1-carboxy-2,3-dihydro-1H-cyclopenta[b]quinoxaline-4,9-dioxide 1-cyano-2,3-dihydro-1H-cyclopenta[b]quinoxaline-4,9-dioxide (5.0 g.) is dissolved in a solution of acetic acid (100 ml.) and 10% hydrochloric acid (50 ml.) and refluxed for 2 hours. Removal of the solvent affords the solid product.

The cyano derivatives of Example XI are likewise hydrolyzed to their respective acids. The compounds bearing lower alkanoyloxy or carbo(lower)alkoxy groups are, of course, hydrolyzed to the precursor hydroxy and carboxy derivatives. They are reacylated or re-esterfied according to known procedures.

The carboxy compounds thus produced are converted to their sodium, potassium, calcium and magnesium salts by neutralization in aqueous solution with the appropriate metal hydroxide. The salts are recovered by lyophilization.

EXAMPLE XIII 1-carbomethoxy-2,3-dihydro-1H-cyclopenta[b]quinoxaline-4,9-dioxide 1 - carboxy-2,3-dihydro-1H-cyclopenta[b]quinoxaline-4,9-dioxide (5 g.) is dissolved in a mixture of chloroform (200 ml.), methanol (5 ml.) and concentrated sulfuric acid (2 ml.) and refluxed for 16 hours. The solution is washed with water (3×500 ml.), dried over anhydrous sodium sulfate and evaporated to a gum. Crystallization from acetone/hexane gives the pure product.

In like manner the carboxy acid derivatives of Example XII are converted to their corresponding methyl esters. Substitution of methanol by ethanol, propanol, n-butanol produces the corresponding lower alkyl esters.

EXAMPLE XIV 1,3-dicarbethoxy-2,3-dihydro-1H-cyclopenta[b]quinoxaline

To 1,2-cyclopentanedione-3,5-diethylcarboxylate (8.4 g.) dissolved in benzene (250 ml.), o-phenylene-diamine 3.75 g.) and one drop of concentrated hydrochloric acid are added and the reaction mixture refluxed for 3 hours, the by-product water being removed by means of a Dean-Stark trap. The benzene is removed in vacuo and the residue extracted with chloroform. The crude product remaining after removal of the chloroform is chromatographed on a column of acid-washed Florisil using chloroform as eluant. The product is obtained as yellow needles; M.P. 190°–200° C. from acetone. Further crystallization from acetone yields yellow needles; M.P. 206°–208° C.

*Analysis.*—Calcd. for $C_{17}H_{18}O_4N_2$: C, 64.95; H, 5.77; N, 8.91%. Found: C, 65.17; H, 5.90; N, 8.84%.

I.R. (CHCl$_3$) Principal absorption maxima 6.19, 6.27, 7.23 (u.) U.V. (CH$_3$OH): λ262($\epsilon$=39,400); shoulder λ323($\epsilon$=11,600), λ337($\epsilon$=14,500); λ348($\epsilon$=14,800); shoulder λ367($\epsilon$=12,700); λ389($\epsilon$=14,300); λ413($\epsilon$=9,250).

The following 1,3-di(carbo(lower)alkoxy) derivatives are similarly prepared from the appropriate 1,2-cyclopentanedione - 3,5-di(lower)alkylcarboxylate: 1,3-dicarbomethoxy-, 1-3-dicarbobutoxy-, 1,3-dicarboisopropoxy-, 1,3-dicarbocaproyloxy-.

EXAMPLE XV 1,3-dicarbethoxy-2,3-dihydro-1H-cyclopenta[b]quinoxaline-4-oxide

A solution of 1,3-dicarbethoxy-2,3-dihydro-1H-cyclopenta[b]quinoxaline (Example XIV, 7.5 g.) in chloroform (1000 ml.) is added dropwise during 30 minutes to a solution of m-chloroperbenzoic acid (5.5 g., 85%) in chloroform (50 ml.) with stirring. The reaction mixture is held overnight at room temperature then washed several times with saturated sodium bicarbonate solution and dried with anhydrous sodium sulfate. The crude product obtained by removal of the chloroform in vacuo is chromatographed on a column of acid-washed Florisil. Elution with chloroform yields the product which crystallizes from acetone/hexane; M.P. 160°–162° C. (1.5 g.).

Further recrystallization yields an analytical sample; M.P. 175°–177° C.

*Analysis.*—Calc. for $C_{17}H_{18}O_5N_2$: C, 61.81; H, 5.49; N, 8.48%. Found: C, 62.04; H, 5.50; N, 8.58%.

I.R. (CHCl$_3$) Principal absorption maxima 5.75, 6.00, 6.16, 7.79, 7.95–8.10 (u.). U.V. (CH$_3$OH): λ239($\epsilon$=8,800), shoulder λ272($\epsilon$=12,460), shoulder λ284$\epsilon$=15,150), λ294–305($\epsilon$=18,500), λ419($\epsilon$=9,100), λ430 ($\epsilon$=9,100).

Substitution of the remaining esters of Example XIV for the dicarbethoxy ester in the above process produces the corresponding 4-oxides.

EXAMPLE XVI 1,3-dicarbethoxy-2,3-dihydro-1H-cyclopenta[b]quinoxaline-4,9-dioxide 1,3 - dicarbethoxy-2,3-dihydro-1H-cyclopenta[b]quinoxaline (Example XIV, 20.29 g.) is dissolved in chloroform (250 ml.). m-Chloroperbenzoic acid (50.0 g.) is then added to the solution and the mixture allowed to stand for three days at room temperature. The by-product, m-chlorobenzoic acid, is filtered off and the filtrate washed with a saturated sodium bicarbonate solution. The residue remaining after evaporation of the solvent is crystallized from acetone/hexane; M.P. 138°–142° C.

I.R. (CHCl$_3$): Principal absorption maxima 5.75, 8.0 and 8.75 (u.). U.V. (CH$_3$OH): λ242($\epsilon$=33,000); shoulder λ315($\epsilon$=7,800), λ325($\epsilon$=10,000); shoulder λ344($\epsilon$=4,500).

The remaining esters of Example XIV are likewise converted to their corresponding dioxides.

EXAMPLE XVII 1,3-dicarboxy-2,3-dihydro-1H-cyclopenta[b]quinoxaline-4,9-dioxide The title product of Example XVI, 1,3-dicarbethoxy-2,3-dihydro-1H-cyclopenta[b]quinoxaline-4,9-dioxide (5 g.), is dissolved in ethanol (250 ml.) and 2NHCl (50 ml.). The solution is refluxed for 6 hours and then concentrated to ⅓ volume. The product (1.5 g.) crystallizes on cooling.

The remaining products of Example XVI are hydrolyzed to the same acid in like manner.

Neutralization of the dicarboxy acids with one and two molar proportions of sodium, potassium, calcium and magnesium hydroxide provides the corresponding metal salts.

EXAMPLE XVIII 1-bromo-2,3-dihydro-1H-cyclopenta[b]quinoxaline-4,9-dioxide 1-hydroxy-2,3-dihydro-1H - cyclopenta[b]quinoxaline-4,9-dioxide (11 g.) dissolved in a mixture of pyridine (50 ml.) and chloroform (100 ml.) is treated with phosphorus tribromide (15 g.). The mixture is allowed to stand at room temperature for 24 hours then washed with water (3×500 ml.). The product is isolated from the residue obtained after removal of the chloroform by vacuum distillation.

Following this procedure the dihydroxy compound of Example X is converted to 1,3-dibromo-2,3-dihydro-1H-cyclopenta[b]quinoxaline-4,9-dioxide.

EXAMPLE XIX 1-methylmercapto-2,3-dihydro-1H-cyclopenta[b]quinoxaline-4,9-dioxide 1-bromo-2,3-dihydro - 1H - cyclopenta[b]quinoxaline-4,9-dioxide is added to a solution containing a two-fold excess of sodium methylmercaptide (10 g.) in ethanol (one l.). The mixture is stirred for 48 hours at room temperature then poured into water (3 l.) and the resulting solution extracted with chloroform. The cloroform solution is dried over anhydrous sodium sulfate and evaporated to a gum. The residual gum is crystallized from acetone/hexane to yield the crystalline product.

This procedure is repeated but using the appropriate mercaptide and the halogenated polymethylene quinoxaline dioxides of Examples VII and VIII to produce the following compounds:

| $R_1$ | $R_2$ |
|---|---|
| —$SC_2H_5$ | H |
| —$SC_4H_9$ | H |
| —$SC_6H_{13}$ | H |
| —$SCH_3$ | —$SCH_3$ |
| —$SC_4H_9$ | —$SC_4H_9$ |
| —SH | H |
| —SH | —SH |
| —SH | —$OCOCH_3$ |
| —$SCH_3$ | —OH |
| —$SCH_3$ | —$OC_5H_{11}$ |
| —$SCH_3$ | —$OCOCH_3$ |
| —SCH | —CN |
| —$SC_2H_5$ | —COOH |
| —$SC_2H_5$ | —$COOC_4H_9$ |
| —$SC_5H_{11}$ | —OH |
| —SH | —OH |
| —$SC_2H_5$ | —$OCO$-i-$C_3H_7$ |

EXAMPLE XX

Lower alkoxy substituted polymethylene quinoxaline dioxides

Repetition of the procedure of Example XIX but using the appropriate sodium alkoxide as reactant in place of sodium methyl mercaptide produces the following compounds:

| $R_1$ | $R_2$ |
|---|---|
| —$OCH_3$ | H |
| —$OC_4H_9$ | H |
| —$OCH_3$ | —$OCH_3$ |
| —$OC_3H_7$ | —$OC_3H_7$ |
| —O-i-$C_3H_7$ | H |
| —$OCH_3$ | —$OCOCH_3$ |
| —$OCH_3$ | —OH |
| —$OC_3H_7$ | —OH |
| —$OC_5H_{11}$ | —$OC_5H_{11}$ |
| —$OCH_3$ | —$SCH_3$ |
| —$OC_2H_5$ | COOH |
| —$OC_2H_5$ | CN |
| —$OCH_3$ | —COO-i-$C_3H_7$ |
| —$OCH_3$ | —$COOC_4H_9$ |
| —$OC_6H_{13}$ | —$OCOC_4H_9$ |

EXAMPLE XXI 1H-cyclopenta[b]quinoxaline-4,9-dioxide 1-hydroxy-2,3-dihydro-1H - cyclopenta[b]quinoxaline-4,9-dioxide (4.0 g.) is dissolved in concentrated sulfuric acid (15 ml.) at room temperature. A dark-green solution rapidly forms and, after 10 minutes, is poured onto cracked ice and the resulting aqueous solution extracted with chloroform. The chloroform solution is dried (anhydrous sodium sulfate) then · evaporated to dryness in vacuo. The residue is crystallized from chloroform/hexane. Recrystallization from chloroform/hexane gives the pure product.

Application of this procedure to the hydroxy substituted compounds of Examples VII, XI, XII, XIII, XIX, XX and XXVI produces the corresponding unsaturated compounds.

EXAMPLE XXII 1-bromo-3-carbethoxy-2,3-dihydro-1H-cyclopenta[b]quinoxaline-4,9-dioxide (13.7 g.) in chloroform (250 ml.) at reflux is added a solution of bromine (8 g.) in chloroform (100 ml.) dropwise during 30 minutes. After an additional 30 minutes at reflux the solution is cooled, washed with saturated sodium bicarbonate and dried with anhydrous sodium sulfate. Evaporation of the chloroform in vacuo at 30°–40° C. provides the product.

In like manner the methyl, isopropyl, n-butyl and amyl esters are prepared from the appropriate 1-carbo-(lower) alkoxy-2,3-dihydro-1H - cyclopenta[b]quinoxaline - 4,9-dioxide.

EXAMPLE XXIII 1-carboxy-1H-cyclopenta[b]quinoxaline-4,9-dioxide 1-cyano-1H-cyclopenta[b]quinoxaline-4,9 - dioxide (50 g., Example XXI) is dissolved in a solution of acetic acid (100 ml.) and 10% hydrochloric acid (50 ml.) and refluxed for two hours. The product is isolated by removal of the solvent.

Esterification of the acid according to the procedure of Example XIII produces the corresponding lower alkyl esters.

Neutralization with the hydroxides of sodium, potassium, calcium and magnesium produces the corresponding salts.

EXAMPLE XXIV 1-acetoxy-1H-cyclopenta[b]quinoxaline-4,9-dioxide 1-bromo-1H-cyclopenta[b]quinoxaline-4,9-dioxide (Example XXI, 4.0 g.) is treated with acetic acid and triethylamine according to Method A of Example IX to produce the title compound.

Hydrolysis of the acetoxy group as described in Example VI affords the corresponding 1-hydroxy compound.

EXAMPLE XXV 1-carbethoxy-2,3-dihydro-1H-cyclopenta[b]quinoxaline-4,9-dioxide

One drop of concentrated hydrochloric acid is added to a solution of 1,2-cyclopentanedione-3-ethylcarboxylate (8.5 g.) and o-phenylenediamine (3.75 g.) in benzene (250 ml.). The solution is refluxed for three hours, the by-product water being removed by means of a Dean-Stark trap. The benzene is evaporated in vacuo and the residue taken up in chloroform. The residue remaining after removal of the chloroform is chromatographed on a column of acid washed Florisil using chloroform as eluant. The product is obtained by evaporation of the eluate.

Oxidation of the product by the procedure of Example XVI provides the title product.

Replacement of 1,2-cyclopentanedione-3-ethylcarboxylate by the homologous methyl-, propyl- and caproyl esters produces the corresponding quinoxaline-4,9-dioxides.

EXAMPLE XXVI 1-acetoxy-3-carbethoxy-2,3-dihydro-1H-cyclopenta[b]quinoxaline-4,9-dioxide Application of the procedure of Method A of Example IX to 1-bromo-3-carbethoxy-2,3-dihydro-1H-cyclopenta[b]quinoxaline-4,9-dioxide provides the title compound.

Acid hydrolysis of the product according to the procedure of Example VI affords 1-hydroxy-3-carboxy-2,3-dihydro - 1H - cyclopenta[b]quinoxaline - 4,9 - dioxide which upon dehydration by the procedure of Example XXI affords 1 -carboxy - 1H - cyclopenta[b]quinoxaline-4,9-dioxide.

EXAMPLE XXVII 1-oxo-2,3-dihydro-1H-cyclopenta[b]quinoxaline-4,9-dioxide

1 - hydroxy - 2,3 - dihydro - 1H - cyclopenta[b]quinoxaline-4,9-dioxide (6.0 g.) is dissolved in alcohol free chloroform (200 ml.) and shaken with a solution of chromium trioxide (10 g.) in water (50 ml.) for 12 hours. The chloroform layer is separated, washed with water, dried with anhydrous sodium sulfate and evaporated in vacuo to give the desired product.

Similarly, the hydroxy derivatives of Examples VII, XI, XII, XIX, XX and XXVI are oxidized to the corresponding oxo-derivatives.

EXAMPLE XXVIII 1-oxo-3-acetoxy-2,3-dihydro-1H-cyclopenta[b]quinoxaline-4,9-dioxide 1 - oxo - 3 - bromo - 2,3 - dihydro - 1H - cyclopenta[b]quinoxaline-4,9-dioxide (3.0 g., 0.01 mole; Example XVII) is treated with acetic acid (0.05 mole) and triethyl-amine (0.03 mole) according to the procedure of Example IX to give the title product.

Repetition of the procedure of this example but using propionic and butyric acids in place of acetic acid produces the corresponding alkanoyloxy compounds.

EXAMPLE XXIX 1-oxo-3-hydroxy-2,3-dihydro-1H-cyclopenta[b]quinoxaline-4,9-dioxide Acid hydrolysis of the title compound of Example XXVIII according to the procedure of Example X affords the title compound.

EXAMPLE XXX 1,3-dioxo-2,3-dihydro-1H-cyclopenta[b]quinoxaline-4,9-dioxide

To a solution of 1,3-dihydroxy-2,3-dihydro-1H-cyclopenta[b]quinoxaline-4,9-dioxide (6.0 g.) in alcohol free chloroform (200 ml.) is added a solution of chromium trioxide (20 g.) in water (100 ml.) The mixture is shaken for 12 hours. The chloroform layer is separated, washed with water and dried with anhydrous sodium sulfate. Evaporation of the solvent in vacuo gives the product.

EXAMPLE XXXI

Acid addition salts

*Method A.*—Dry hydrogen chloride gas is bubbled into a methanol solution of the desired cyclopenta[b]quinoxaline-4,9-dioxide compound at room temperature until precipitation of the salt is complete.

*Method B.*—The desired cyclopenta[b]quinoxaline-4,9-dioxide (0.01 mole) is dissolved in methanol and a stoichiometric amount of mineral acid added. The solution is stirred at room temperature for 30 minutes and the acid salt recovered by evaporation of the solvent or by precipitation with a non-solvent, e.g. ether. In this way the acid addition salts of sulfuric, nitric, hydrochloric, hydrobromic and phosphoric acids are prepared.

EXAMPLE XXXII

The efficacy of the herein described cyclopenta[b]quinoxaline-4,9-dioxides in promoting the growth of chicks is demonstrated in a series of tests conducted with Vantress-white-rock chicks. In these tests, the day-old chicks are divided into 4 lots of 25 each of one sex, and kept in electrically heated brooders on raised wire floors. Each lot is assigned to a different compartment and fed a basal diet supplemented with 0.05% by weight of 1,3-dihydroxy - 2,3 - dihydro - 1H - cyclopenta[b]quinoxaline-4,9-dioxide. A control in which no supplementation is added is also run. The growth and feed efficiency responses of each group are observed to 8 weeks of age. The composition of the basal ration is indicated below. The supplements are added to the diet in premix form at the expense of yellow corn meal.

| Ingredient: | Percent of mix |
|---|---|
| Yellow Corn Meal | 56.65 |
| Soybean Oil Meal (50% Protein) | 33.75 |
| Alfalfa Meal (17% Protein) | 2.00 |
| Stabilized Animal Fat | 3.50 |
| Multi-Phos (Dicalcium Phosphate) | 2.00 |
| Iodized Salt | 0.50 |
| Trace Mineral Vitamin Premix * | 0.60 |
| Limestone | 1.00 |
| Total | 100.00 |

*Trace Mineral Vitamin Premix.

| Vitamin-5% of Feed: | Percent of premix |
|---|---|
| Vitamin A-10 | 10 |
| Vitamin $D_3$=3000 | 10 |
| Choline chloride (25%) | 35.25 |
| Niacin (80%) | 0.55 |
| Calcium Pantothenate (45%) | 10 |
| Riboflavin-4 | 0.39 |
| B-12-60 | 0.2 |
| Vigofac-6 | 30 |
| Fine Corn Meal | 3.75 |

Mineral Mix—0.05% of Feed: Percent of mineral premix

| | |
|---|---|
| Manganese | 24.0 |
| Iodine | 0.48 |
| Iron | 8.0 |
| Copper | 0.8 |
| Zinc | 0.04 |
| Cobalt | 0.08 |

Vigofac is the registered trademark of Chas. Pfizer & Co., Inc. for unidentified poultry and livestock growth factors obtainable from *Streptomyces* fermentation sources.

The chicks are observed daily, weighed weekly and the average gain per bird, the growth index and feed efficiency determined.

The 1,3 - dihydroxy-2,3-dihydro-1H-cyclopenta[b]quinoxaline-4,9-dioxide supplemented diet is found to produce a significant increase in weight gained and a substantial improvement in feed efficiency.

Repetition of this procedure but using the following quinoxaline-4,9-dioxides produces similar results:

2,3-dihydro-1H-cyclopenta[b]quinoxaline-4,9-dioxide
1-hydroxy-2,3-dihydro-1H-cyclopenta[b]quinoxaline-4,9-dioxide
1-acetoxy-2,3-dihydro-1H-cyclopenta[b]quinoxaline-4,9-dioxide
1,3-diacetoxy-2,3-dihydro-1H-cyclopenta[b]quinoxaline-4,9-dioxide
1-methoxy-2,3-dihydro-1H-cyclopenta[b]quinoxaline-4,9-dioxide
1-oxo-2,3-dihydro-1H-cyclopenta[b]quinoxaline-4,9-dioxide
1-oxo-3-carboxy-2,3-dihydro-1H-cyclopenta[b]quinoxaline-4,9-dioxide

EXAMPLE XXXIII

The procedure of Example XXXIII is repeated but using 1,3 - dihydroxy-2,3-dihydro-1H-cyclopenta[b]quinoxaline-4,9-dioxide at levels of 0.002%, 0.01% and 0.025% by weight of feed. In each case improvement in growth and feed efficiency is noted.

EXAMPLE XXXIV

Groups of baby pigs are fed on a completely balanced diet previously proven highly useful for this type of animal. These animals weaned at approximately six to eight days of age, are fed over several days on a pre-starter diet containing 60.1% dry skimmed milk, 10.1% soybean oil, 9.9% glucose hydrate, 1.1% brewer's yeast, 0.4% of oxytetracycline feed supplement containing 5 g./lb. of oxytetracycline, 16% soybean oil meal and a complete vitamin and mineral supplement. The pigs are then fed a "starter diet" of fine ground yellow corn, rolled oats, soybean oil meal, glucose hydrate, dicalcium phosphate, iodized salt, soybean oil, oxytetracycline supplement, vitamin mix and mineral mix. The starter feed for some of the groups is supplemented with 100 g./ton of 1-hydroxy-2,3-dihydro-1H - cyclopenta[b]quinoxaline - 4,9-dioxide. This feed is given the animals when they are about three weeks old and continued over a total of four weeks.

The supplemented diet is found to result in important weight gain and significant improvement in feed efficiency.

EXAMPLE XXXV

Five-week old chickens are infected with coliform air sacculities by injecting 1.0 ml. of a 24-hour broth culture containing 2 different antibiotic (tetracycline) resistant, avian pathogenic strains of *Escherichia coli* into the left posterior thoracic air sac. The quinoxaline-di-N-oxide test compound is administered in the feed, the medicated ration being fed for a 5-day period starting 2 days prior to the coliform injection. The feed is tendered to the birds for imbibition ad. libitum. Twenty-five hundred grams of medicated feed containing 0.05% by weight of the test compound is provided per 10 birds. When this is all consumed, non-medicated basal feed is given to the end of the trial.

The chickens are checked as to mortality, weight change, feed consumption pre- and post-injection and, after sacrifice 3 days post-injection, for air sac lesions. The following quinoxaline-di-N-oxides are tested:

2,3-dihydro-1H-cyclopenta[b]quinoxaline-4,9-dioxide
1-hydroxy-2,3-dihydro-1H-cyclopenta[b]quinoxaline-4,9-dioxide
1,3-dihydroxy-2,3-dihydro-1H-cyclopenta[b]quinoxaline-4,9-dioxide
1-oxo-2,3-dihydro-1H-cyclopenta[b]quinoxaline-4,9-dioxide
1,3-diacetoxy-2,3-dihydro-1H-cyclopenta[b]quinoxaline-4,9-dioxide
1,3-dimethoxy-2,3-dihydro-1H-cyclopenta[b]quinoxaline-4,9-dioxide
1-carbethoxy-2,3-dihydro-1H-cyclopenta[b]quinoxaline-4,9-dioxide
1-bromo-3-oxo-2,3-dihydro-1H-cyclopenta[b]quinoxaline-4,9-dioxide
1-methylmercapto-2,3-dihydro-1H-cyclopenta[b]quinoxaline-4,9-dioxide
1-carboxy-2,3-dihydro-1H-cyclopenta[b]quinoxaline-4,9-dioxide sodium salt
1-chloro-2,3-dihydro-1H-cyclopenta[b]quinoxaline-4,9-dioxide hydrochloride
1-hydroxy-2,3-dihydro-1H-cyclopenta[b]quinoxaline4,9-dioxide sulfate All compounds are effective in reducing mortality, lesion scars and in increasing body weight and feed consumption. Effective control of the infection is realized.

EXAMPLE XXXVI

Five-week old chickens are inoculated into the left posterior thoracic air sac with 0.5 ml. of a 24-hour broth culture containing 2 different antibiotic. (tetracycline) resistant, avian pathogenic strains of *E. coli*. The test compound is administered by subcutaneous injection of an aqueous solution into the upper cervical region at the time of infection. Observations on mortality, feed consumption post-injection, weight change and, after sacrifice, air sac lesions core are made. Ten birds are used for each test.

Effective control of the coliform infection is observed particularly at dosage levels of approximately 10 mg./kg. body weight and higher with the following 2,3-dihydro-1H-cyclopenta[b]quinoxaline-4,9-dioxides:

| Compound: | Dose mg./kg. |
|---|---|
| 1,3-dihydroxy- | 10 |
| 1,3-diacetoxy- | 10 |
| 1,3-dibutyryloxy- | 10 |
| 1,3-dibromo (used as hydrochloride salt) | 10 |
| 1,3-dibromo | 5 |
| 1-hydroxy- | 5 |
| 1-hydroxy- | 2.5 |
| 1-oxo | 10 |
| 1-acetoxy-3-carbethoxy- | 10 |
| 1-acetoxy-3-carbethoxy- | 20 |
| 1-carboxy- (used as sodium salt) | 10 | and 1 - carboxy-1H-cyclopenta[b]quinoxaline-4,9-dioxide sodium salt.

EXAMPLE XXXVII

The relative efficacy of the quinoxaline-di-N-oxides against *Mycoplasma gallisepticum* infection in chicks is demonstrated by exposing six-week old chicks, divided into groups of 10 birds to the Mycoplasma infection by injection of 0.5 ml. of a 72-hour broth culture, diluted with an equal volume of sterile heart infusion broth into the left posterior thoracic air sac. The test compound is administered in the basal feed at a level of 0.05%. Medication is started 48 hours before exposure and continued for 72 hours past exposure for a total of 5 days medication. Two replicates of each test are run.

The Mycoplasma infection alone exerts a pronounced effect on the lesion score. Significant improvement of this characteristic reaction is obtained with 2,3-dihydro-1H-cyclopenta[b]quinoxaline-4,9 - dioxide, with 1,3 - dihydroxy- and 1,3 - diacetoxy-2,3-dihydro-1H-cyclopenta[b] quinoxaline-4,9-dioxide and with the remaining compounds of this invention.

Similar results are obtained when this procedure is repeated but using N-type PPLO as the infecting organism.

What is claimed is:

1. A method for the control of coliform air sacculitis in poultry which comprises orally or parenterally administering to said poultry a coliform air sacculitis controlling amount of a compound selected from the group consisting of (a) 2,3-dihydro-1H-cyclopenta[b]quinoxaline-4,9-dioxide,

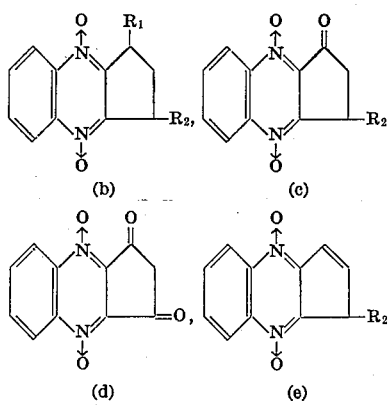

(b)   (c)

(d)   (e)

wherein $R_1$ is selected from the group consisting of hydroxy, lower alkoxy, mercapto, lower alkylmercapto, lower alkanoyloxy, cyano, carboxy, carbo-(lower)alkoxy, chloro and bromo and $R_2$ is selected from the group consisting of hydrogen and $R_1$, (f) the non-toxic mineral acid addition salts thereof and (g) when either or both of $R_1$ and $R_2$ is carboxy, the alkali metal and alkaline earth metal salts thereof.

2. The method of claim 1 wherein the compound is administered orally.

3. The method of claim 1 wherein the compound is administered parenterally.

4. A method for promoting growth and improving feed efficiency of domestic animals which comprises orally or parenterally administering to a domestic animal a growth-promoting amount of a compound selected from the group consisting of (a) 2,3-dihydro-1H-cyclopenta[b]quinoxaline-4,9-dioxide,

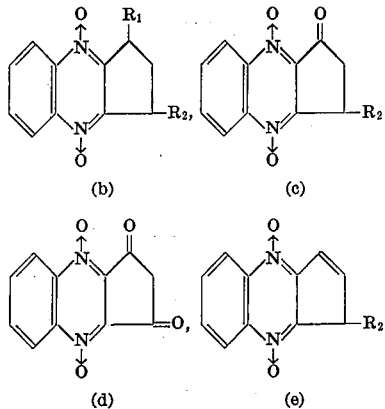

wherein $R_1$ is selected from the group consisting of hydroxy, lower alkoxy, mercapto, lower alkylmercapto, lower alkanoyloxy, cyano, carboxy, carbo-(lower)alkoxy, chloro and bromo and $R_2$ is selected from the group consisting of hydrogen and $R_1$, (f) the non-toxic mineral acid addition salts thereof and (g) when either or both of $R_1$ and $R_2$ is carboxy, the alkali metal and alkaline earth metal salts thereof.

5. A feed composition comprising a nutritionally balanced domestic animal feed containing a growth promoting amount of a compound selected from the group consisting of (a) 2,3-dihydro-1H-cyclopenta[b]quinoxaline-4,9-dioxide,

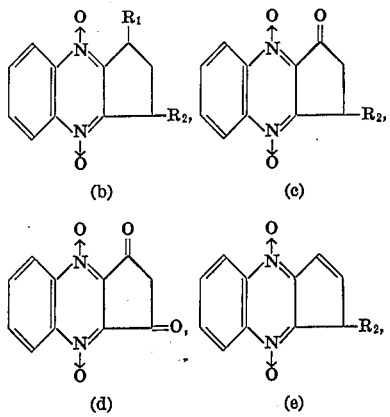

wherein $R_1$ is selected from the group consisting of hydroxy, lower alkoxy, mercapto, lower alkylmercapto, lower alkanoyloxy, cyano, carboxy, carbo-(lower)alkoxy, chloro and bromo and $R_2$ is selected from the group consisting of hydrogen and $R_1$, (f) the non-toxic mineral acid addition salts thereof and (g) when either or both of $R_1$ and $R_2$ is carboxy, the alkali metal and alkaline earth metal salts thereof.

6. The animal feed composition of claim 5 wherein the compound is present at a level of from about 10 g. to about 125 g./ton of feed.

References Cited

UNITED STATES PATENTS

| | | | |
|---|---|---|---|
| 3,479,354 | 11/1969 | Galt | 424—250 |
| 3,480,713 | 11/1969 | Johnston | 424—250 |
| 3,485,836 | 12/1969 | Johnston | 424—250 |
| 3,507,870 | 4/1970 | Johnston | 424—250 |

JEROME D. GOLDBERG, Primary Examiner

V. D. TURNER, Assistant Examiner

U.S. Cl. X.R.

99—2 M, 2 G

UNITED STATES PATENT OFFICE
CERTIFICATE OF CORRECTION

Patent No. 3,644,622      Dated February 22, 1972

Inventor(s) James David Johnston

It is certified that error appears in the above-identified patent and that said Letters Patent are hereby corrected as shown below:

Columns 5 and 6, lines 32-40, that portion of the right-hand formula reading

Column 10, line 10, "15.050" should read -- 15,050 --.

Column 14, line 32, "18,500" should read -- 18,550 --.

Signed and sealed this 11th day of July 1972.

(SEAL)
Attest:

EDWARD M. FLETCHER, JR.      ROBERT GOTTSCHALK
Attesting Officer      Commissioner of Patents